US009122459B2

(12) United States Patent
Peng (10) Patent No.: US 9,122,459 B2
(45) Date of Patent: Sep. 1, 2015

(54) FIXING MECHANISM AND RELATED ELECTRONIC DEVICE (71) Applicant: Wistron Corporation, New Taipei (TW)

(72) Inventor: Hsing-Wei Peng, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 176 days.

(21) Appl. No.: 14/077,231

(22) Filed: Nov. 12, 2013

(65) Prior Publication Data
US 2014/0268540 A1    Sep. 18, 2014

(30) Foreign Application Priority Data

Mar. 14, 2013  (TW) .............................. 102109088 U (51) Int. Cl.
G06F 1/16    (2006.01)
G06F 1/18    (2006.01)
G11B 33/12   (2006.01)

(52) U.S. Cl.
CPC .............. *G06F 1/187* (2013.01); *G11B 33/124* (2013.01)

(58) Field of Classification Search
CPC ....................................................... G06F 1/187
USPC ........................................ 361/679.33–679.39
See application file for complete search history.

(56) References Cited

U.S. PATENT DOCUMENTS

| 6,122,165 | A  | * | 9/2000  | Schmitt et al. ........... | 361/679.31 |
| 6,396,686 | B1 | * | 5/2002  | Liu et al. .................. | 361/679.33 |
| 6,785,141 | B2 | * | 8/2004  | Fang ............................. | 361/727 |
| 7,259,960 | B2 | * | 8/2007  | Hua et al. ................. | 361/679.33 |
| 7,441,744 | B2 | * | 10/2008 | Chen et al. .................... | 248/694 |
| 7,492,586 | B2 | * | 2/2009  | Peng et al. ............. | 361/679.33 |
| 7,495,904 | B2 | * | 2/2009  | Liang et al. ............. | 361/679.39 |
| 7,542,280 | B2 | * | 6/2009  | Hong et al. ............. | 361/679.33 |
| 2005/0063152 | A1 | * | 3/2005 | Chen et al. ..................... | 361/685 |
| 2005/0190535 | A1 | * | 9/2005 | Peng et al. ..................... | 361/685 |
| 2006/0139871 | A1 | * | 6/2006 | Chen et al. ..................... | 361/685 |
| 2007/0164170 | A1 | * | 7/2007 | Huang et al. ................. | 248/27.1 |
| 2008/0057781 | A1 | * | 3/2008 | Chen et al. .................... | 439/577 |
| 2009/0167124 | A1 | * | 7/2009 | Lee et al. .................. | 312/223.2 |
| 2010/0165564 | A1 | * | 7/2010 | Lu ............................. | 361/679.35 |

* cited by examiner

*Primary Examiner* — Adrian S Wilson
(74) *Attorney, Agent, or Firm* — Winston Hsu; Scott Margo (57) ABSTRACT A detachable fixing mechanism includes a supporter, a contacting component, a fixing component, a track component and an ejecting component. An electronic component is hold be the supporter. The supporter includes a base, a rear wall and two lateral walls. The rear wall and the lateral walls are disposed on three sides of the base. The contacting is connected to an upper edge of the lateral wall, so as to buckle the electronic component with the base. The fixing component is movably disposed on the lateral wall. The fixing component includes a constraint portion to resiliently pass through a hole on the lateral wall. The track component is disposed on the lateral wall of the supporter. The ejecting component is slidably disposed between the track component and the supporter. A second part of the ejecting component inserts into the supporter to contact against the rear end of the electronic component.

20 Claims, 7 Drawing Sheets

FIXING MECHANISM AND RELATED ELECTRONIC DEVICE

BACKGROUND OF THE INVENTION

1. Field of the Invention

The present invention relates to a fixing mechanism and a related electronic device, and more particularly, to a detachable fixing mechanism applied to a removable hard disk and having rapid disassembling function without utilization of a tray and the related electronic device.

2. Description of the Prior Art

A conventional computer system, such as the personal computer or the commercial server, includes a plurality of detachable hard disk devices, and the detachable hard disk device is disposed on an inner bracket of the computer system via the conventional tray. With the advanced technology, aesthetic design of the computer system (including the personal computer and the commercial server) can be varied according to consumer trend for matching the user's demand, and the inner bracket and the related detachable tray device of the computer system are designed to conform to variation of the casing aesthetic of the computer system. However, develop and usage period of the consumer computer product are decreased, manufacturing cost and manufacturing period of the product are wasted as the tray device has been designed according to each variation of the casing aesthetic of the computer system, and reliability test and adjustment of the tray device are necessary during development of the product, which delays scheduled progress of the product. Therefore, design of a detachable hard disk device without a tray for tooless assembly/disassembly function is an important issue in the related computer mechanical industry.

SUMMARY OF THE INVENTION

The present invention provides a detachable fixing mechanism applied to a removable hard disk and having rapid disassembling function without utilization of a tray and the related electronic device for solving above drawbacks.

According to the claimed invention, a detachable fixing mechanism includes a supporter, a contacting component, a fixing component, a track component and an ejecting component. The supporter supports an electronic component. The supporter includes a base, a rear wall and two lateral walls. The rear wall and the lateral walls are respectively disposed on three sides of the base. The lateral wall constrains a movement of the electronic component relative to the base along a first direction. The contacting component is disposed on an upper edge of the at least one lateral wall in a bending manner for buckling the electronic component with the base, so as to constrain a movement of the electronic component relative to the base along a second direction different from the first direction. The fixing component is movably disposed on the at least one lateral wall.

The fixing component includes a constraint portion to resiliently pass through a hole on the lateral wall for contacting against a side of the electronic component, so as to constrain a movement of the electronic component relative to the base along a third direction different from the first direction and the second direction. The track component is disposed on the lateral wall of the supporter. The ejecting component is slidably disposed between the track component and the supporter. The ejecting component includes a first part, a second part and a pushing portion. The first part is movably disposed inside the track component. The second part is connected to an end of the first part in a bending manner. The second part inserts into the supporter to contact against a rear end of the electronic component. The pushing portion is connected to the other end of the first part.

According to the claimed invention, an opening slot structure is disposed on an end of the lateral wall, the fixing component is a curved resilient unit. A first end of the fixing component is disposed on an outer surface of the lateral wall, and a second end of the fixing component different from the first end is movably disposed inside the opening slot structure.

According to the claimed invention, the fixing component further includes a driving portion disposed on the second end. An amount of movement of the driving portion is substantially equal to a width of the opening slot structure.

According to the claimed invention, the fixing component is a resilient pin disposed on the outer surface of the lateral wall.

According to the claimed invention, a sliding slot is formed on the lateral wall, and the second part of the ejecting component movably passes through the sliding slot.

According to the claimed invention, the supporter further includes a holding portion disposed on the lateral wall. The ejecting component is slidably disposed on the holding potion.

According to the claimed invention, the ejecting component further includes at least one resilient structure formed on the first part or the second part for contacting between the supporter and the electronic component.

According to the claimed invention, the ejecting component further includes a third part. The first part and the third part are respectively connected to two ends of the second part in the bending manner.

According to the claimed invention, the detachable fixing mechanism further includes an insulating component disposed on the base of the supporter.

According to the claimed invention, the detachable fixing mechanism further includes at least one cushioning component disposed on the rear wall or the lateral wall on inner surfaces of the supporter.

According to the claimed invention, an electronic device includes a casing, a bracket and at least one detachable fixing mechanism. The bracket is disposed inside the casing. The detachable fixing mechanism is disposed on the bracket. The detachable fixing mechanism includes a supporter, a contacting component, a fixing component, a track component and an ejecting component. The supporter supports an electronic component. The supporter includes a base, a rear wall and two lateral walls. The rear wall and the lateral walls are respectively disposed on three sides of the base. The lateral wall constrains a movement of the electronic component relative to the base along a first direction. The contacting component is disposed on an upper edge of the at least one lateral wall in a bending manner for buckling the electronic component with the base, so as to constrain a movement of the electronic component relative to the base along a second direction different from the first direction. The fixing component is movably disposed on the at least one lateral wall.

The fixing component includes a constraint portion to resiliently pass through a hole on the lateral wall for contacting against a side of the electronic component, so as to constrain a movement of the electronic component relative to the base along a third direction different from the first direction and the second direction. The track component is disposed on the lateral wall of the supporter. The ejecting component is slidably disposed between the track component and the supporter. The ejecting component includes a first part, a second part and a pushing portion. The first part is movably disposed inside the track component. The second part is connected to an end of the first part in a bending manner. The second part inserts into the supporter to contact against a rear end of the electronic component. The pushing portion is connected to the other end of the first part.

The detachable fixing mechanism of the present invention utilizes the supporter and the fixing component to be triple directional constraint function for the electronic component, and further utilizes the resilient ejecting component, which can absorb the vibration, to rapidly disassemble the electronic component from the supporter by a tooless method. Therefore, the detachable fixing mechanism and the related electronic device of the present invention have advantages of simple structure and easy operation, not only can assemble and disassemble the electronic component by the tooless method, but also conforms to the environmental friendly purpose due to manufacture decrease of the model for economizing the product cost and the manufacturing period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
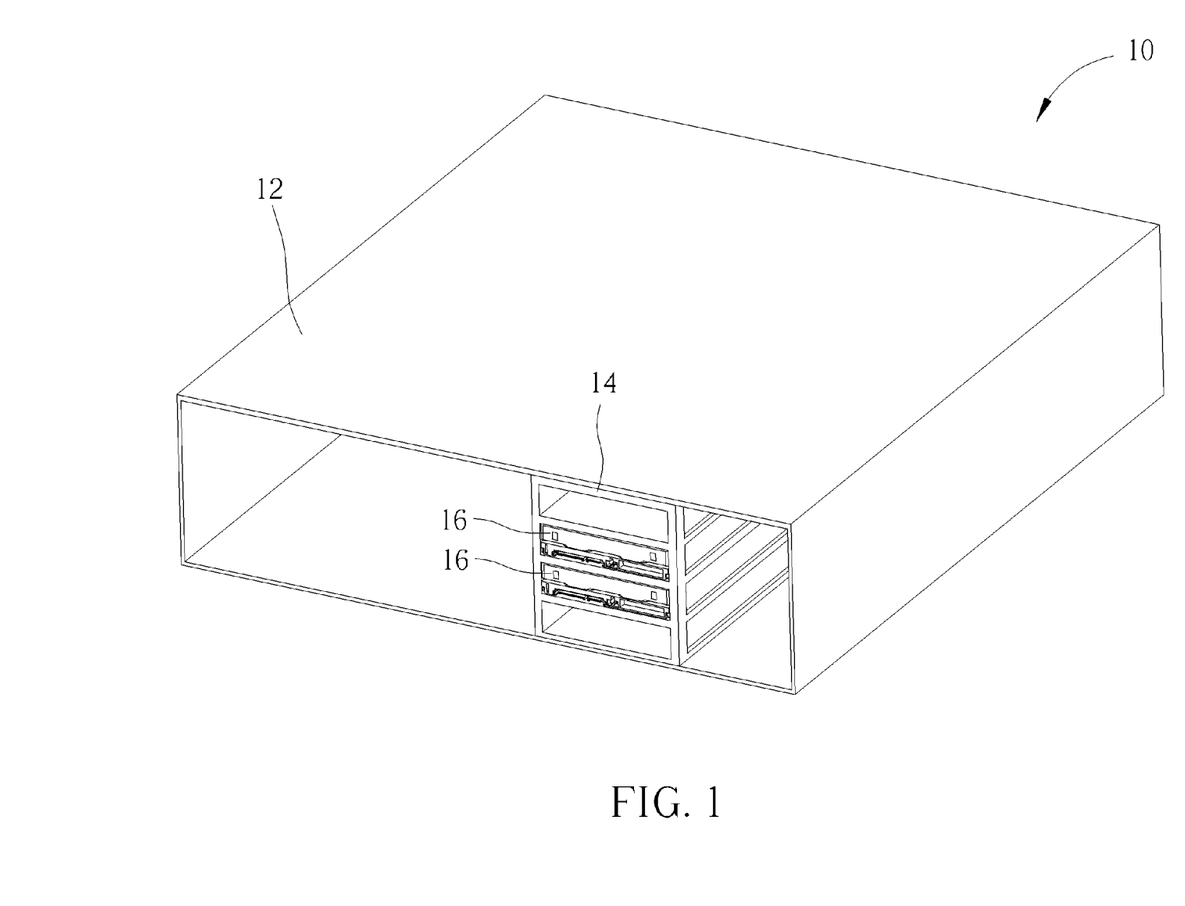
FIG. 1 is a diagram of an electronic device according to an embodiment of the present invention.

Please refer to FIG. 1. FIG. 1 is a diagram of an electronic device 10 according to an embodiment of the present invention. The electronic device 10 includes a casing 12, a bracket 14 and a plurality of detachable fixing mechanisms 16. The electronic device 10 can be a server host, which has a plurality of hard disks for storing data. The hard disk is disposed on the corresponding detachable fixing mechanism 16. The plurality of detachable fixing mechanisms 16 is disposed on corresponding positions of the bracket 14. The user can manually assemble and disassemble the hard disk (or the other electronic components, such as an optical disk driver) from the detachable fixing mechanism 16.

Figure 2:
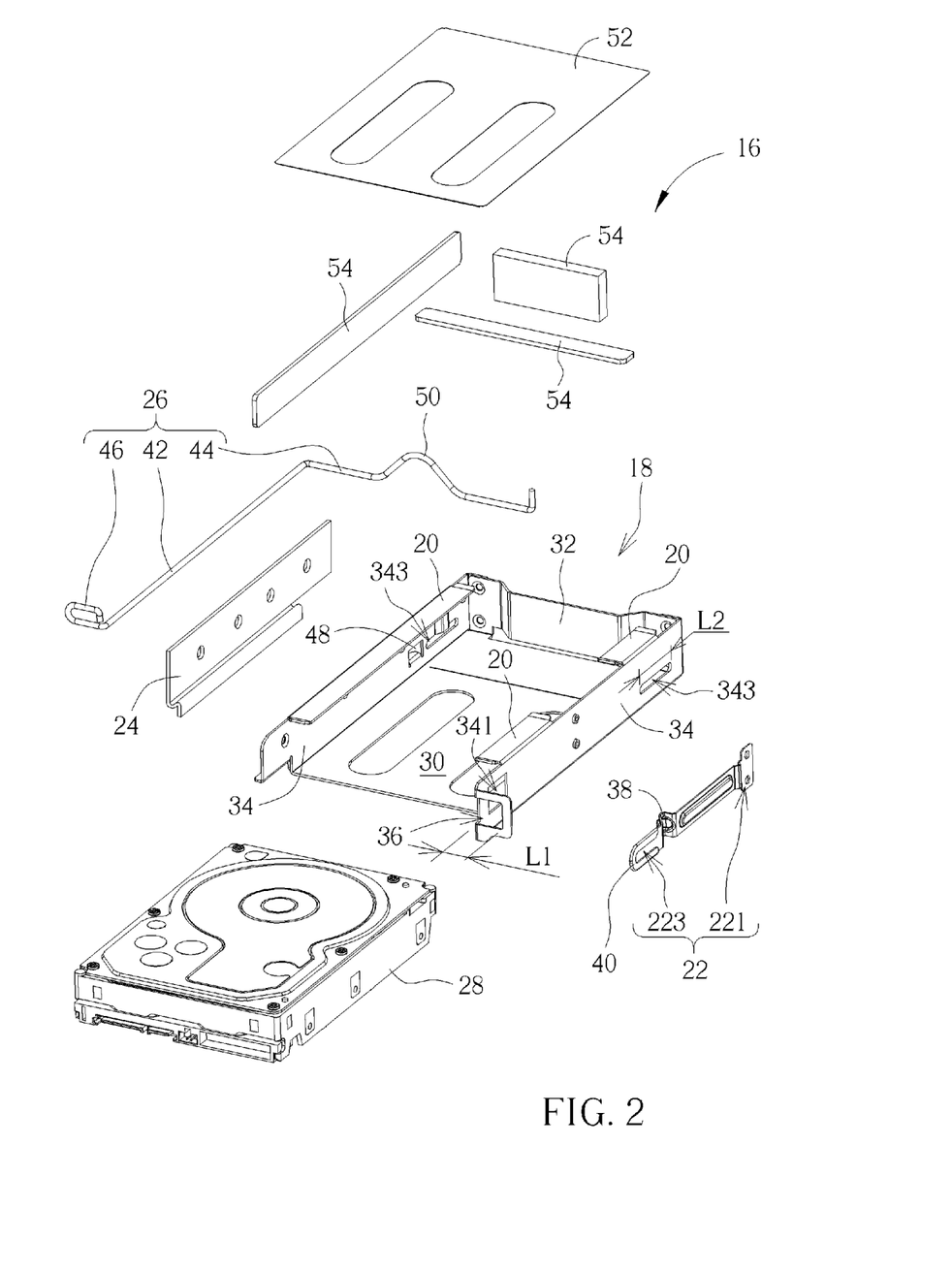
FIG. 2 is an exploded diagram of a detachable fixing mechanism according to the embodiment of the present invention.

Please refer to FIG. 2. FIG. 2 is an exploded diagram of the detachable fixing mechanism 16 according to the embodiment of the present invention. The detachable fixing mechanism 16 includes a supporter 18, a plurality of contacting components 20, a fixing component 22, a track component 24 and an ejecting component 26. The supporter 18 can supporter the electronic component 28, such as the hard disk or the optical disk driver. The supporter 18 includes a base 30, a rear wall 32 and two lateral walls 34. The rear wall 32 and the lateral walls 34 are respectively disposed on three sides of the base 30. The fourth side of the base 30 that has no wall can be an entrance of the supporter 18 for the electronic component 28.

The contacting component 20 is connected to an upper edge of the lateral wall 34 in a bending manner, so that an assembly of the base 30, the lateral walls 34 and the contacting component 20 can form a buckling structure for fixing the electronic component 28. The fixing component 22 is movably disposed on the lateral wall 34. In the preferred embodiment of the present invention, the fixing component 22 can be a curved resilient unit. A first end 221 of the fixing component 22 is disposed on an outer surface of the lateral wall 34, and a second end 223 of the fixing component 22 different form the first end 221 is movably disposed inside an opening slot structure 36 of the lateral wall 34. The fixing component 22 can include a constraint portion 38 and a driving portion 40. The constraint portion 38 is located at a surface of the fixing component 22 adjacent to the lateral wall 34. The fixing component 22 can move relative to the lateral wall 34 by the resilient force, and the constraint portion 38 can pass through a hole 341 on the lateral wall 34 in a resiliently recovering manner, so as to contact against a side of the electronic component 28 for movement constraint. The driving portion 40 is disposed on the second end 223, and an amount of movement of the driving portion 40 is substantially equal to a width L1 of the opening slot structure 36.

In addition, the track component 24 is disposed on the outside of the lateral wall 34 of the supporter 18. The ejecting component 26 is slidably disposed between the track component 24 and the supporter 18. The ejecting component 26 is driven to eject the electronic component 28 from the supporter 18. Further, the ejecting component 26 includes a first part 42, a second part 44 and a pushing portion 46. The first part 42 is movably disposed inside the track component 24, and the track component 24 can constrain a moving direction of the ejecting component 26 relative to the supporter 18. The second part 44 is connected to an end of the first part 42 in a bending manner, and the pushing portion 46 is connected to the other end of the first part 42 different from the second part 44, so that the ejecting component 26 can be a L-shaped structure. The second part 44 movably passes through the sliding slot 343 on the lateral wall 34 to insert into the supporter 18 for contacting against the rear end of the electronic component 28, which means the second part 44 is located between the electronic component 28 and the rear wall 32 of the supporter 18.

The supporter 18 can further include a holding portion 48 disposed on the lateral wall 34. When the ejecting component 26 slides along the track component 24, the holding portion 48 can hold a bottom of the first part 42 of the ejecting component 26. The ejecting component 26 can further include at least one resilient structure 50 formed on the first part 42 or the second part 44 selectively. The resilient structure 50 is a flexibly deformable structure made of resilient material. The resilient structure 50 can contact between the supporter 18 and the electronic component 28 to absorb vibration for preventing the electronic component 28 from damage. Besides, the detachable fixing mechanism 16 can further include an insulating component 52 and a plurality of cushioning components 54. The insulating component 52 is disposed on the base 30 of the supporter 18. Because the supporter 18 is made of metal material, the insulating component 52 can effectively isolate the supporter 18 and a circuit board disposed on the bottom of the electronic component 28 to prevent short. The plurality of cushioning components 54 is disposed on the rear wall 32 or the lateral walls 34 on inner surfaces of the supporter 18 for absorbing the vibration.

Figure 3:
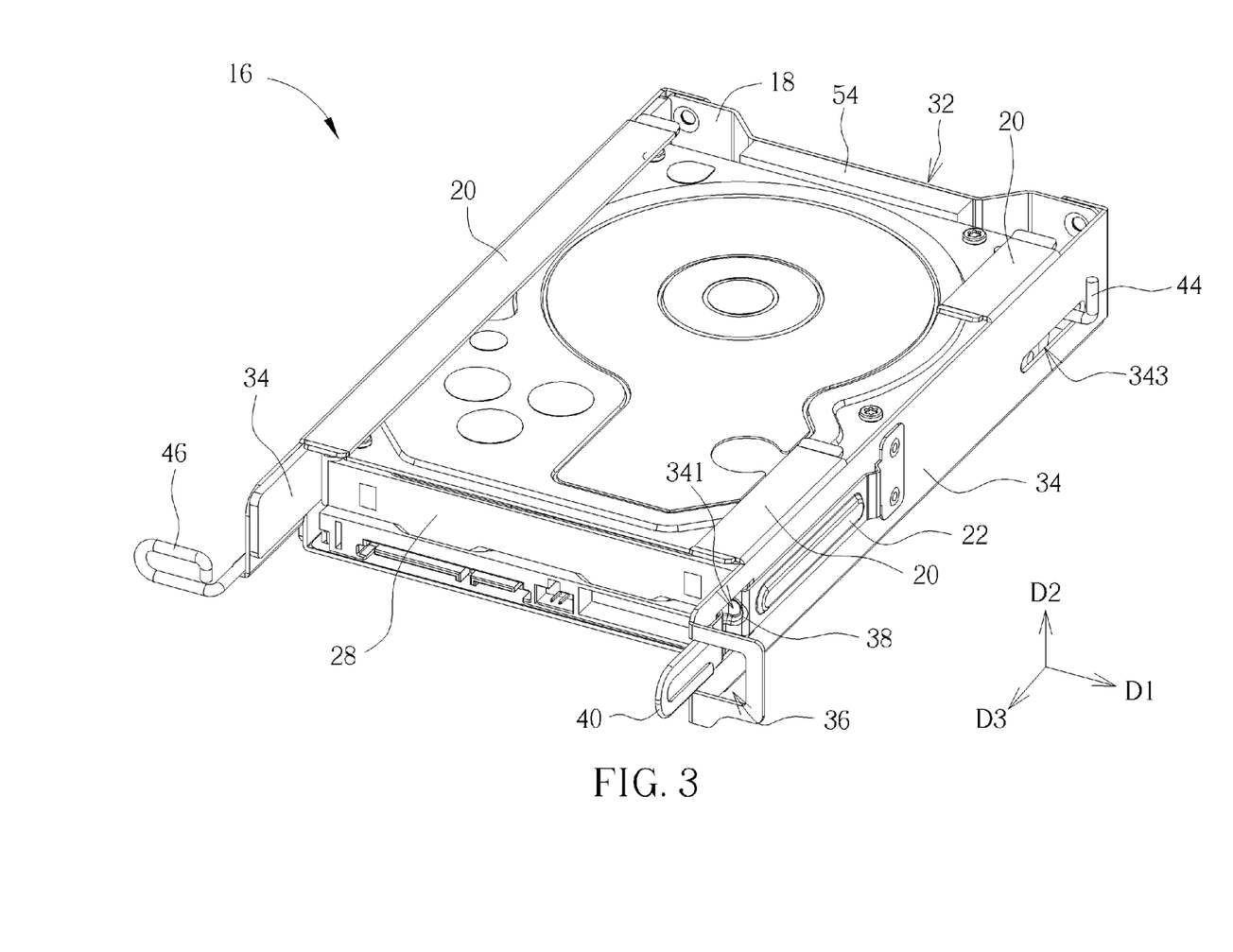
FIG. 3 is an assembly diagram of the detachable fixing mechanism and an electronic component according to the embodiment of the present invention.

Please refer to FIG. 2 and FIG. 3. FIG. 3 is an assembly diagram of the detachable fixing mechanism 16 and the electronic component according to the embodiment of the present invention. The electronic component 28 can insert into the supporter 18 via a side of the base 30 that has no wall, so that the two lateral walls 34 of the supporter 18 respectively buckle a left side and a right side of the electronic component 28, to constrain a movement of the electronic component 28 relative to the base 30 along a first direction D1. The contacting component 20 and the base 30 further respectively buckle an upper side and a low side of the electronic component 28, to constrain a movement of the electronic component 28 relative to the base 30 along a second direction D2 different from the first direction D1. The constraint portion 38 of the fixing component 22 can protrude from the hole 341 to contact against the electronic component 28, so as to constrain a movement of the electronic component 28 relative to the base 30 along a third direction D3 different from the first direction D1 and the second direction D2. Therefore, the electronic device 10 of the present invention can utilize the detachable fixing mechanism 16 to stably fix the electronic component 28 on the bracket 14.

Figure 4:
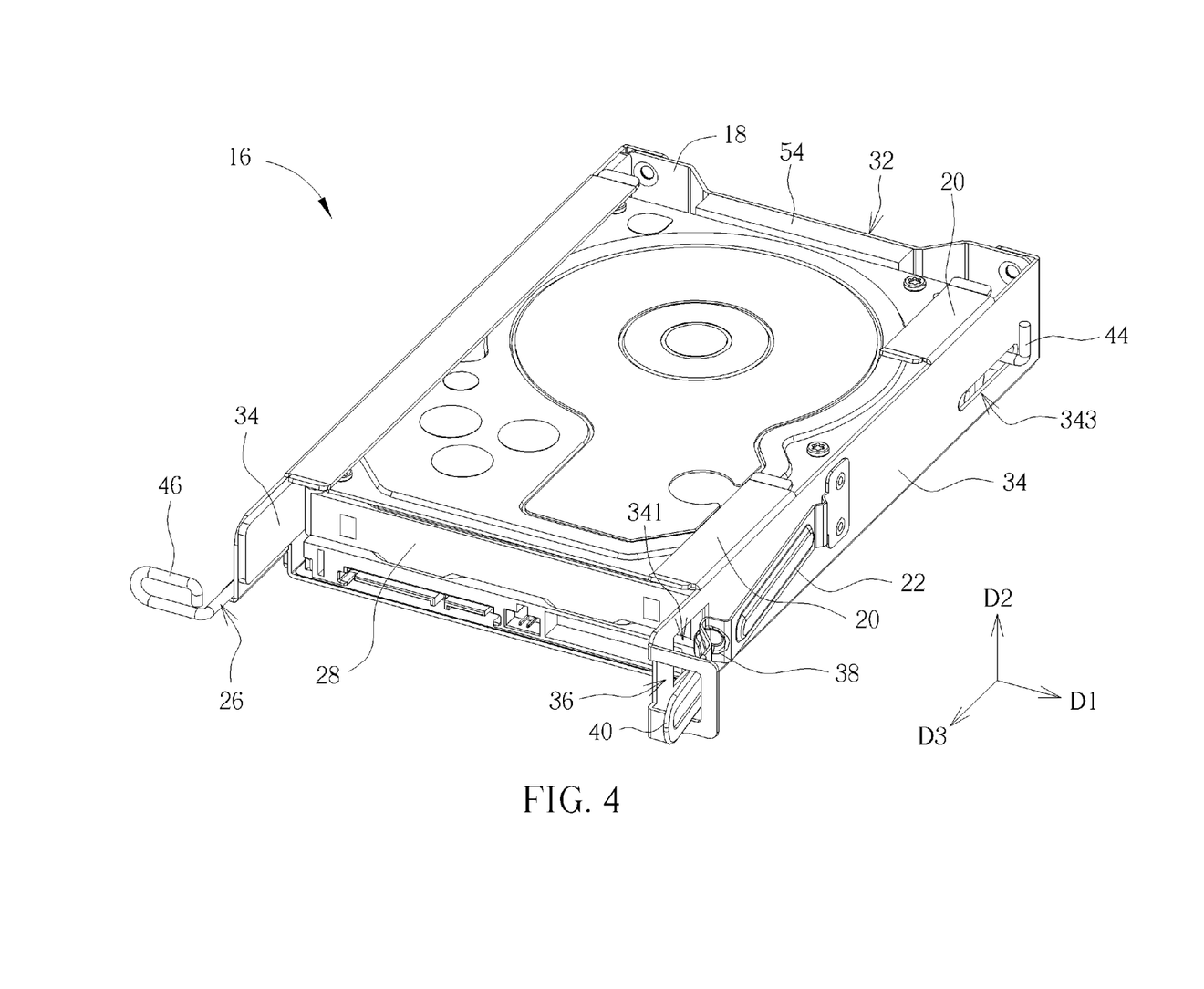
FIG. 4 and FIG. 5 respectively are diagrams of the detachable fixing mechanism in different operation procedures according to the embodiment of the present invention.
Figure 5:
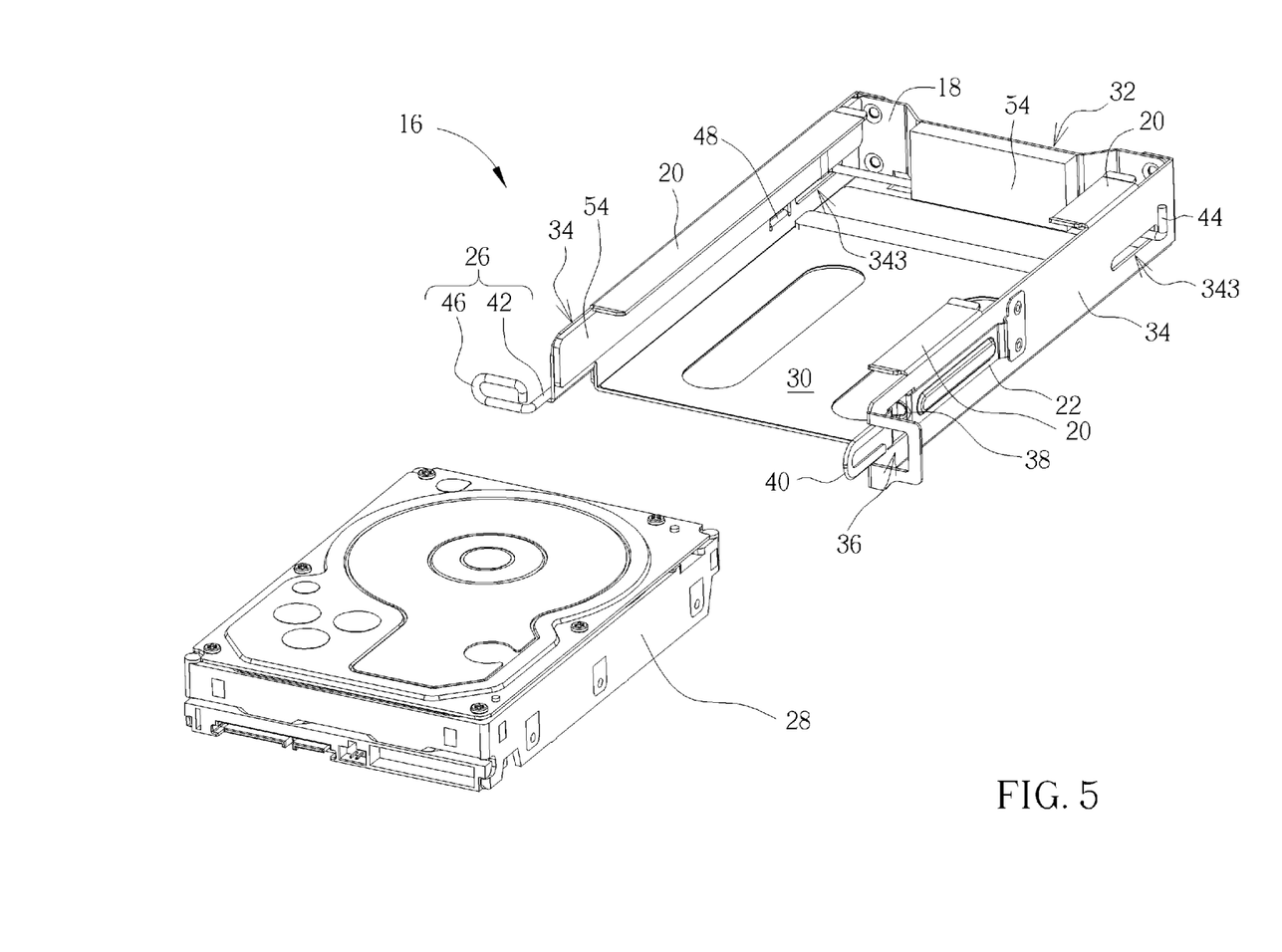

As shown in FIG. 3, the electronic component 28 is disposed inside the detachable fixing mechanism 16. For disassembling the electronic component 28 from the detachable fixing mechanism 16, the fixing component 22 can be pulled open to remove a constraint of the detachable fixing mechanism 16 for the electronic component 28. Please refer to FIG. 2, FIG. 4 and FIG. 5. FIG. 4 and FIG. 5 respectively are diagrams of the detachable fixing mechanism 16 in different operation procedures according to the embodiment of the present invention. As shown in FIG. 4, the driving portion 40 can be forced to generate resilient deformation of the fixing component 22. The constraint portion 38 moves away from the hole 341, and the electronic component 28 is not constrained along the third direction D3. Then, the ejecting component 26 can be pulled along the third direction D3, the second part 44 of the ejecting component 26 pushes the rear end of the electronic component 28, so as to move the electronic component 28 out of the supporter 18 for disassembly of the electronic component 28.

A moving distance of the ejecting component 26 relative to the track component 24 along the third direction D3 is substantially equal to a length L2 of the sliding slot 343, as shown in FIG. 2. It is to say, the ejecting component 26 of the detachable fixing mechanism 16 can move the electronic component 28 partly out of the supporter 18, and then the user can manually take the electronic component 28 away from the supporter 18, as shown in FIG. 5. After the electronic component 28 is separated from the supporter 18, the external force applied to the fixing component 22 can be removed, and the fixing component 22 can recover to an original position that the fixing component 22 attaches to the lateral wall 34 of the supporter 18 by its own resilient recovering force; meanwhile, the constraint portion 38 of the fixing component 22 passes through the hole 341. Further, the electronic component 28 is pushed into the supporter 18 at a direction opposite to the third direction D3 for assembling the electronic component 28 with the detachable fixing mechanism 16. The electronic component 28 can press the constraint portion 38 out of the hole 341 to remove the constraint of the fixing component 22 along the third direction D3. As the electronic component 28 completely inserts into the supporter 18, the resilient recovering force of the fixing component 22 drives the constraint portion 38 to pass through the hole 341, so as to constrain the electronic component 28 along the third direction D3.

Figure 6:
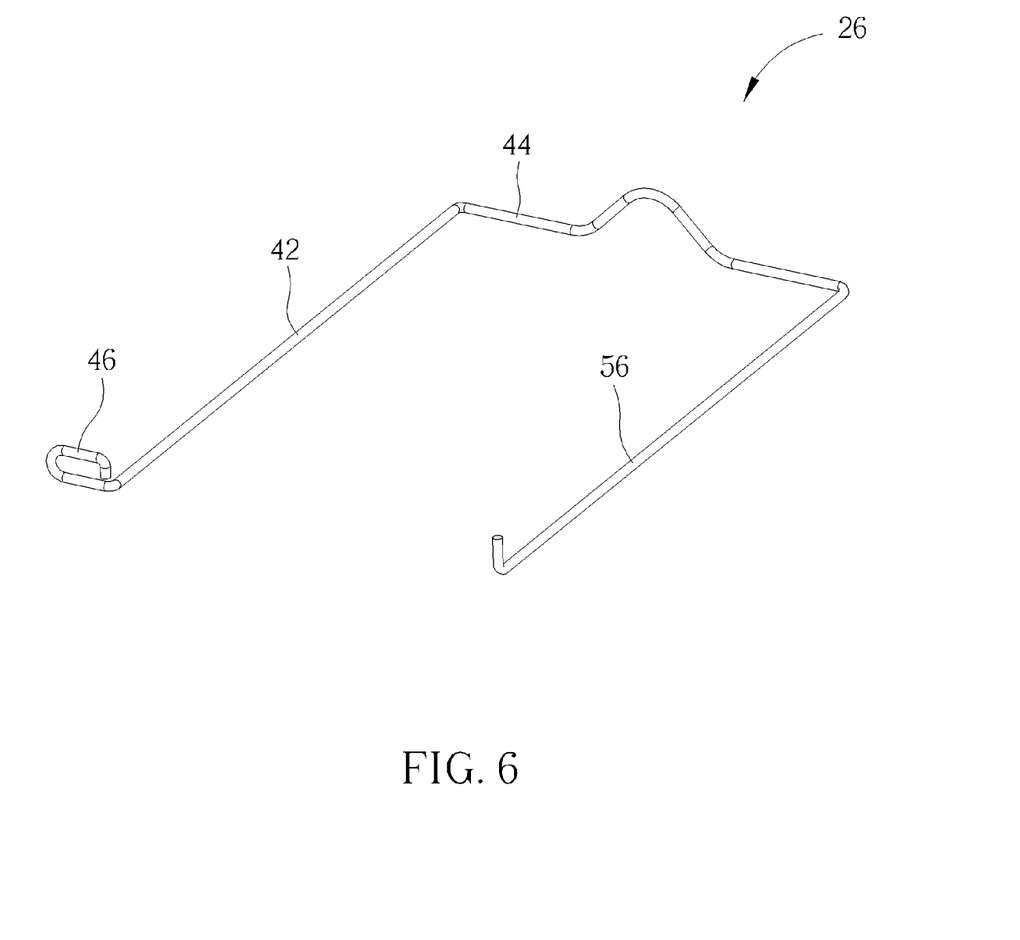
FIG. 6 is a diagram of an ejecting component according to the other embodiment of the present invention.

Please refer to FIG. 6. FIG. 6 is a diagram of the ejecting component 26 according to the other embodiment of the present invention. The ejecting component 26 not only can be the L-shaped structure as the above-mentioned embodiment, but also can be designed as a U-shaped structure. In this embodiment, elements having the same numeral as ones of the above-mentioned embodiment have the same structures and functions, and the detailed description is omitted herein for simplicity. As show in FIG. 6, difference between the embodiments is that the ejecting component 26 can include the first part 42, the second part 44, the pushing portion 46 and a third part 56. The first part 42 and the third part 56 are respectively connected to two ends of the second part 44 in the bending manner. The first part 42 and the third part 56 of the ejecting component 26 can respectively slide along the two opposite lateral walls 34 of the supporter 18, so as to provide a balanced pushing force for stably moving the electronic component 28 out of the supporter 18.

Figure 7:
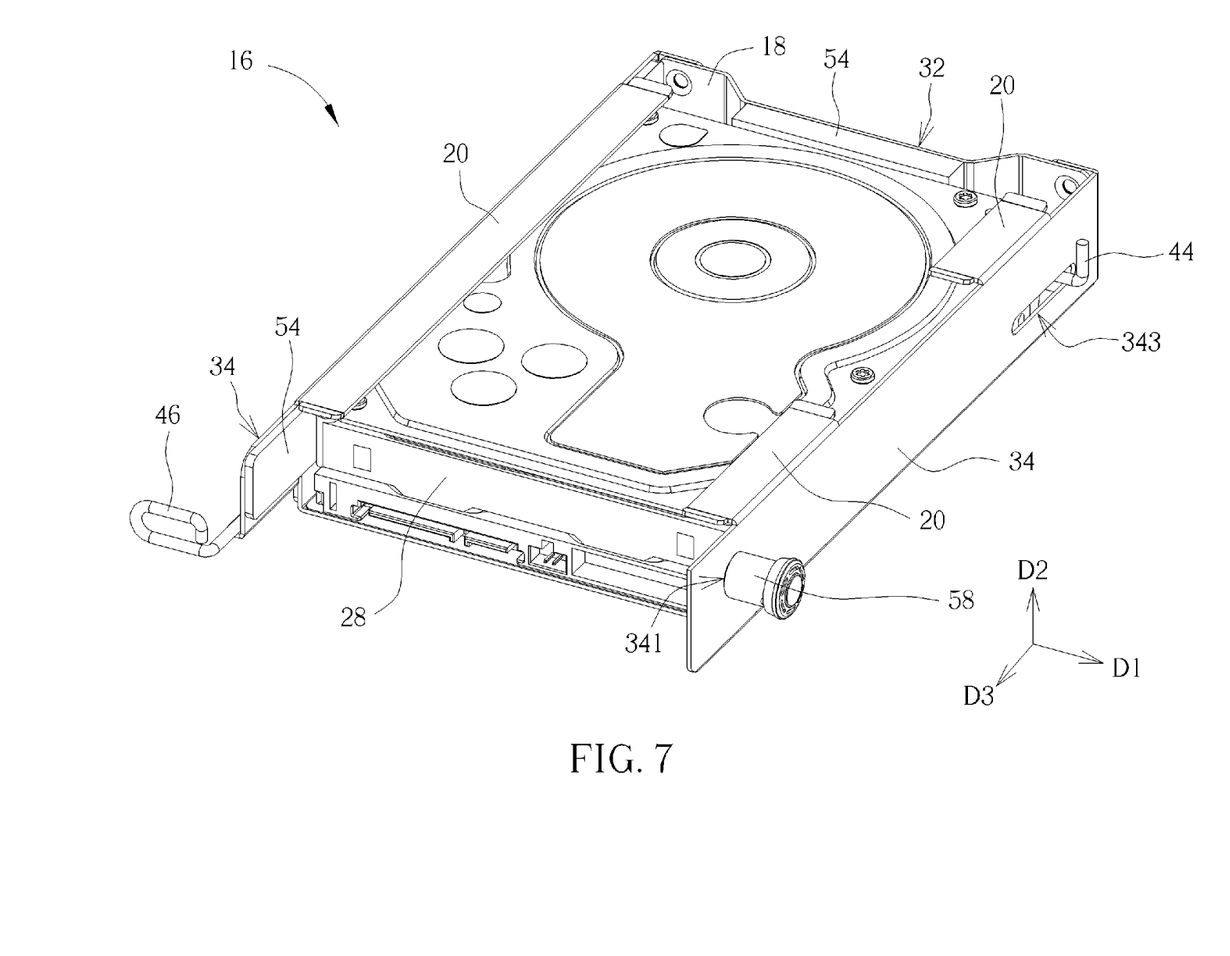
FIG. 7 is a diagram of the detachable fixing mechanism according to the other embodiment of the present invention.

Please refer to FIG. 7. FIG. 7 is a diagram of the detachable fixing mechanism 16 according to the other embodiment of the present invention. In this embodiment, elements having the same numeral as ones of the above-mentioned embodiment have the same structures and functions, and the detailed description is omitted herein for simplicity. Difference between the embodiments is that the detachable fixing mechanism 16 utilizes a resilient pin 58 to be the fixing component. The resilient pin 58 is disposed on the outer surface of the lateral wall 34. The constraint portion of the resilient pin 58 can pass through the hole 341 to contact against the outside of the electronic component 28 for the constraint along the third direction D3. The resilient pin 58 can be pulled along the first direction D1, and the constraint portion moves away from the hole 341 for removing the constraint, so as to separate the electronic component 28 from the supporter 18. Then, the external force applied to the resilient pin 58 can be removed, the resilient recovering force of the resilient pin 58 drives the constraint portion to insert into the hole 341 for restarting the constraint function.

Comparing to the prior art, the detachable fixing mechanism of the present invention utilizes the supporter and the fixing component to be triple directional constraint function for the electronic component, and further utilizes the resilient ejecting component, which can absorb the vibration, to rapidly disassemble the electronic component from the supporter by a tooless method. Therefore, the detachable fixing mechanism and the related electronic device of the present invention have advantages of simple structure and easy operation, not only can assemble and disassemble the electronic component by the tooless method, but also conforms to the environmental friendly purpose due to manufacture decrease of the model for economizing the product cost and the manufacturing period.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detachable fixing mechanism comprising:
   a supporter for supporting an electronic component, the supporter comprising a base, a rear wall and two lateral walls, the rear wall and the lateral walls being respectively disposed on three sides of the base, the lateral wall constraining a movement of the electronic component relative to the base along a first direction;
   a contacting component disposed on an upper edge of the at least one lateral wall in a bending manner for buckling the electronic component with the base, so as to constrain a movement of the electronic component relative to the base along a second direction different from the first direction;

a fixing component movably disposed on the at least one lateral wall, the fixing component comprising a constraint portion to resiliently pass through a hole on the lateral wall for contacting against a side of the electronic component, so as to constrain a movement of the electronic component relative to the base along a third direction different from the first direction and the second direction;

a track component disposed on the lateral wall of the supporter; and an ejecting component slidably disposed between the track component and the supporter, the ejecting component comprising:

a first part movably disposed inside the track component;

a second part connected to an end of the first part in a bending manner, the second part inserting into the supporter to contact against a rear end of the electronic component; and a pushing portion connected to the other end of the first part.

2. The detachable fixing mechanism of claim 1, wherein an opening slot structure is disposed on an end of the lateral wall, the fixing component is a curved resilient unit, a first end of the fixing component is disposed on an outer surface of the lateral wall, a second end of the fixing component different from the first end is movably disposed inside the opening slot structure.

3. The detachable fixing mechanism of claim 2, wherein the fixing component further comprises a driving portion disposed on the second end, an amount of movement of the driving portion is substantially equal to a width of the opening slot structure.

4. The detachable fixing mechanism of claim 1, wherein the fixing component is a resilient pin disposed on the outer surface of the lateral wall.

5. The detachable fixing mechanism of claim 1, wherein a sliding slot is formed on the lateral wall, the second part of the ejecting component movably passes through the sliding slot.

6. The detachable fixing mechanism of claim 1, wherein the supporter further comprises a holding portion disposed on the lateral wall, the ejecting component is slidably disposed on the holding potion.

7. The detachable fixing mechanism of claim 1, wherein the ejecting component further comprises:

at least one resilient structure formed on the first part or the second part for contacting between the supporter and the electronic component.

8. The detachable fixing mechanism of claim 1, wherein the ejecting component further comprises:

a third part, the first part and the third part being respectively connected to two ends of the second part in the bending manner.

9. The detachable fixing mechanism of claim 1, further comprising:

an insulating component disposed on the base of the supporter.

10. The detachable fixing mechanism of claim 1, further comprising:

at least one cushioning component disposed on the rear wall or the lateral wall on inner surfaces of the supporter.

11. An electronic device comprising:

a casing;

a bracket disposed inside the casing; and at least one detachable fixing mechanism disposed on the bracket, the detachable fixing mechanism comprising:

a supporter for supporting an electronic component, the supporter comprising a base, a rear wall and two lateral walls, the rear wall and the lateral walls being respectively disposed on three sides of the base, the lateral wall constraining a movement of the electronic component relative to the base along a first direction;

a contacting component disposed on an upper edge of the at least one lateral wall in a bending manner for buckling the electronic component with the base, so as to constrain a movement of the electronic component relative to the base along a second direction different from the first direction;

a fixing component movably disposed on the at least one lateral wall, the fixing component comprising a constraint portion to resiliently pass through a hole on the lateral wall for contacting against a side of the electronic component, so as to constrain a movement of the electronic component relative to the base along a third direction different from the first direction and the second direction;

a track component disposed on the lateral wall of the supporter; and an ejecting component slidably disposed between the track component and the supporter, the ejecting component comprising:

a first part movably disposed inside the track component;

a second part connected to an end of the first part in a bending manner, the second part inserting into the supporter to contact against a rear end of the electronic component; and a pushing portion connected to the other end of the first part.

12. The electronic device of claim 11, wherein an opening slot structure is disposed on an end of the lateral wall, the fixing component is a curved resilient unit, a first end of the fixing component is disposed on an outer surface of the lateral wall, a second end of the fixing component different from the first end is movably disposed inside the opening slot structure.

13. The electronic device of claim 12, wherein the fixing component further comprises a driving portion disposed on the second end, an amount of movement of the driving portion is substantially equal to a width of the opening slot structure.

14. The electronic device of claim 11, wherein the fixing component is a resilient pin disposed on the outer surface of the lateral wall.

15. The electronic device of claim 11, wherein a sliding slot is formed on the lateral wall, the second part of the ejecting component movably passes through the sliding slot.

16. The electronic device of claim 11, wherein the supporter further comprises a holding portion disposed on the lateral wall, the ejecting component is slidably disposed on the holding potion.

17. The electronic device of claim 11, wherein the ejecting component further comprises:

at least one resilient structure formed on the first part or the second part for contacting between the supporter and the electronic component.

18. The electronic device of claim 11, wherein the ejecting component further comprises:

a third part, the first part and the third part being respectively connected to two ends of the second part in the bending manner.

19. The electronic device of claim 11, wherein the detachable fixing mechanism further comprises:
- an insulating component disposed on the base of the supporter.

20. The electronic device of claim 11, wherein the detachable fixing mechanism further comprises:
- at least one cushioning component disposed on the rear wall or the lateral wall on inner surfaces of the supporter.

* * * * *